Patented Sept. 6, 1938

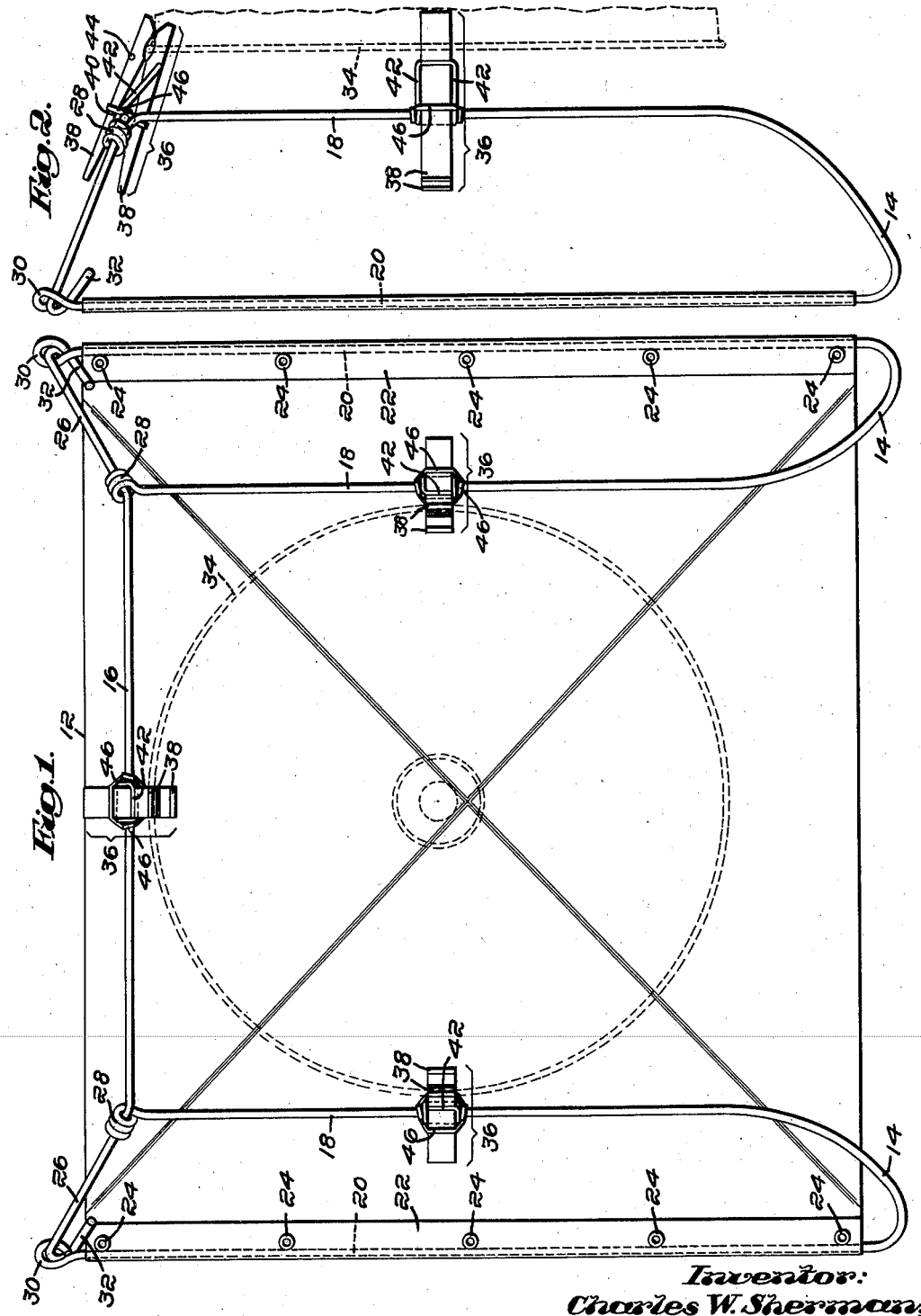

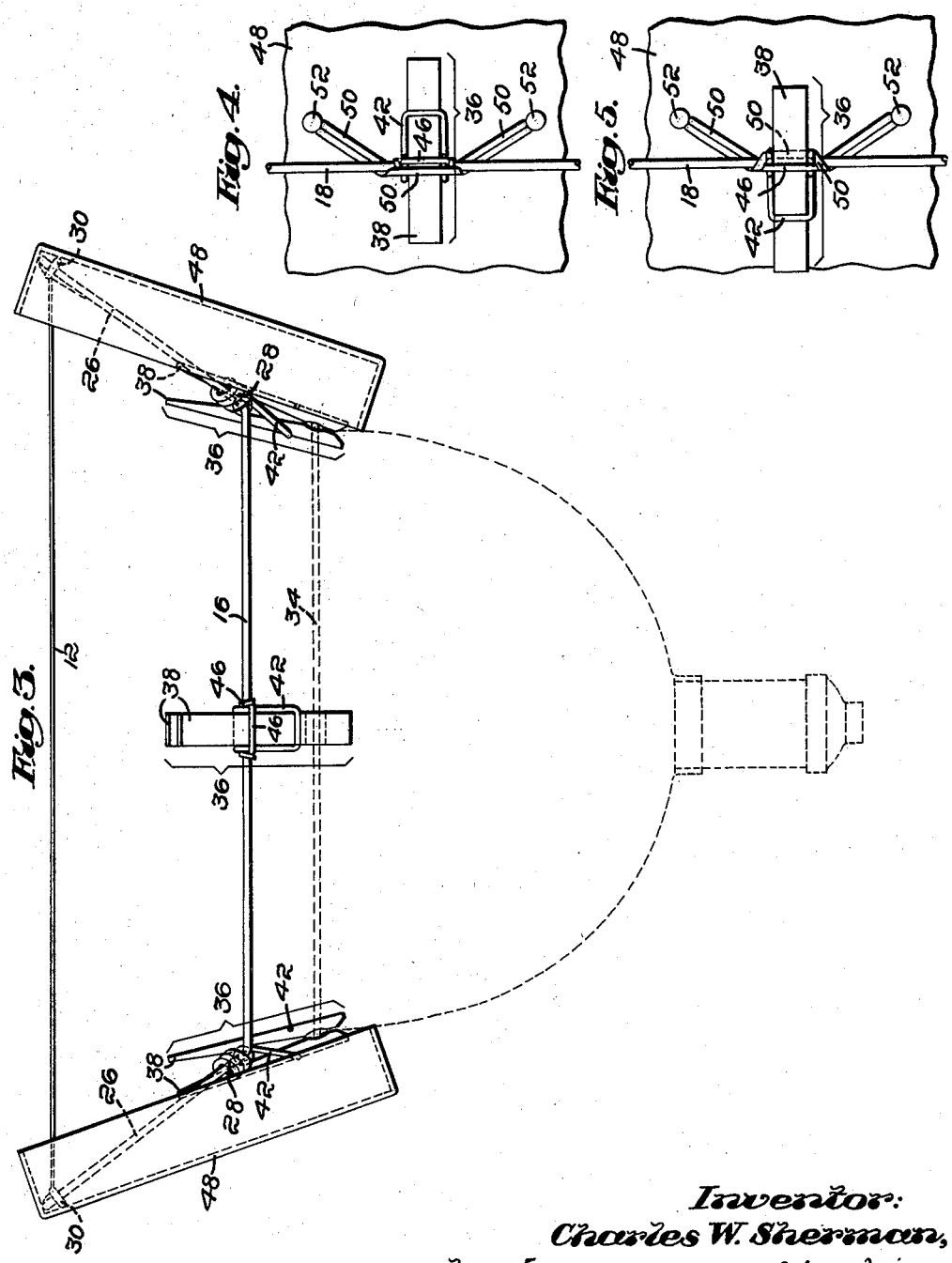

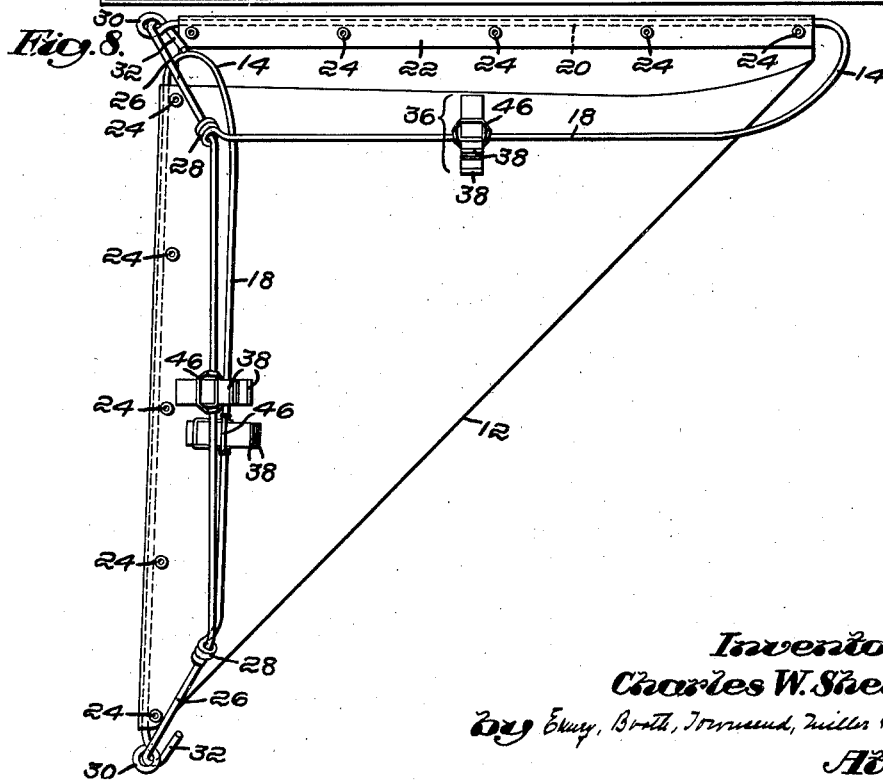

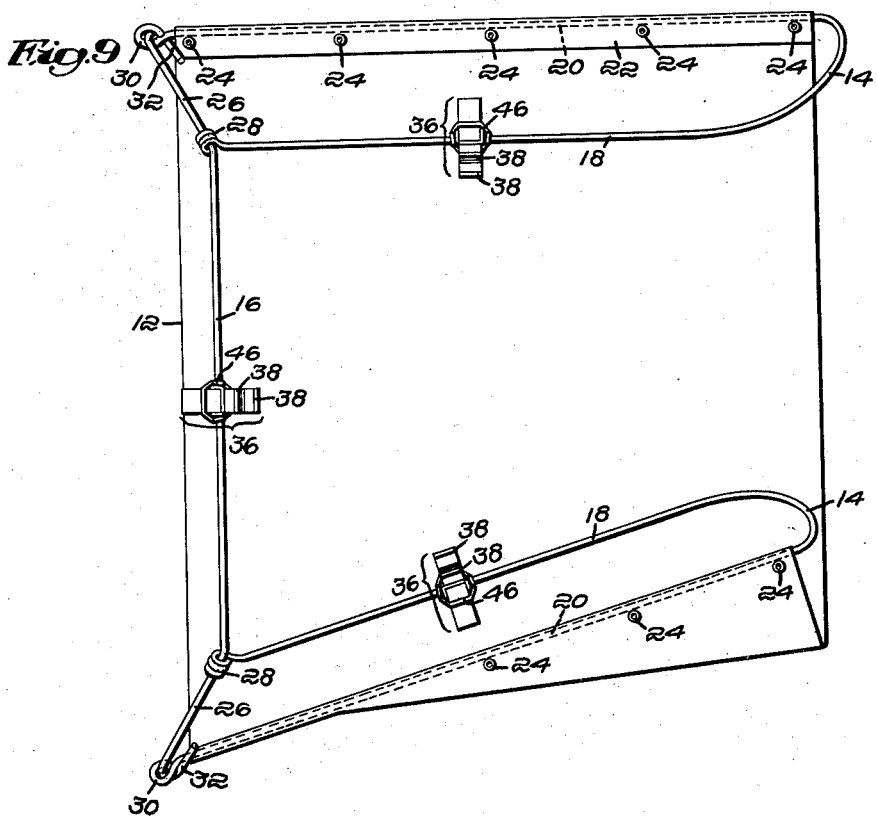

2,129,154

UNITED STATES PATENT OFFICE 2,129,154

DIFFUSING SCREEN

Charles W. Sherman, Boston, Mass.

Application March 12, 1936, Serial No. 68,408

4 Claims. (Cl. 240—1.3)

This invention relates to a light transmitting and diffusing device for use with a light source such as a lamp employed to illuminate a subject or a model which is being photographed. When a high-powered lamp is used "raw", the illumination is harsh and the contrasts in the photograph are apt to be unpleasantly severe. This is true especially when a light-concentrating reflector is associated with the lamp.

Another important factor is the fact that high-powered, incandescent bulbs generate heat which is so intense that it must be taken into consideration in the location of the diffusing screen with relation to the lamp and the reflector so that the hot air can escape. Otherwise, the screen will become scorched and may even be ignited.

Still another important consideration is the fact that light rays striking the screen are likely to be reflected laterally and rearwardly, in which case, if they fall upon the camera lens are apt to cause what is known as flare in the picture.

A further matter to be considered is the desirability of making the device collapsible or foldable so that it will occupy a small space when it is being transported from place to place and when it is to be stored when not in use.

The present invention aims to provide a device which shall satisfy all of these desirable conditions, and which shall be simple, inexpensive, and quickly and conveniently manipulated in setting it up for use and in collapsing it afterward.

The invention will best be understood by reference to the following description of a light transmitting and diffusing device embodying the invention, while its scope will be pointed out more particularly in the appended claims.

In the drawings:

Fig. 1 is a rear elevation of one form of light transmitting and diffusing device embodying the invention;

Fig. 2 is a side elevation of the same;

Fig. 3 is a plan of the device with the addition of two light intercepting walls at the sides to intercept rays which are reflected rearwardly and laterally by the rear surface of the screen;

Figs. 4 and 5 are elevations illustrating the attachment of one of the light intercepting walls to the frame;

Fig. 6 is a plan of the device collapsed or folded and placed within one part of a two-part box whose two parts are to be used as the two light-intercepting walls at the two sides of the frame;

Fig. 7 is a plan of one of the box parts by itself;

Fig. 8 is an elevation illustrating the first step in unfolding the device after removing it from the box; and Fig. 9 is an elevation illustrating the second step in unfolding the device.

Referring to the drawings and to the embodiment of the invention illustrated therein by way of example, there is shown a light controlling device comprising a translucent, diffusing screen 12 (see Fig. 1) of flexible sheet material such as cloth. The screen is supported by a collapsible frame presently to be described, which normally holds the screen stretched and extended in a plane and by which the screen may be supported on a reflector or on a shade holder associated with a light source such as an incandescent electric lamp.

As herein shown, the supporting frame comprises two identical side members 14 and a third top member 16 which connects the side members and normally holds them spaced apart. The three members, in the present example, are conveniently formed of wire. Each side member, as shown, has two parallel portions 18 and 20. The portions 20 are suitably attached to two opposite margins 22 of the screen 12 as by folding and wrapping the margins about the portions 20, and fastening the folds as by eyelets 24, or by simply hemming the same by a line of stitching.

To enable the frame to be collapsed and extended conveniently, the side members 18 are appropriately jointed to the top member 16 as by providing the latter with two obliquely disposed arms 26, which constitute pivots for the side members. The portion 18 of each side member is provided with a coil 28 about the associated arm 26, and the portion 20 is provided with an eye 30, also about the associated arm. The side members are conveniently locked in extended position by providing the arms 26 with locking portions 32 which are normally disposed between the portions 20, i. e., they are inwardly disposed and hence lock the side members 14 against swinging movement toward each other about the arms 26 as pivots. When, however, the frame is to be collapsed, the unlocking is accomplished by sliding the eyes 30 downwardly along the arms 26 past the lower ends of the locking portions 32, whereupon the members 14 can be swung freely inwardly toward each other and alongside the member 16 (see Fig. 6).

The frame is conveniently secured to the rim of a reflector 34 shown in dotted lines in Figs. 1, 2 and 3, as by spring clips 36 which are well known and are sometimes used as substitutes for clothespins and for like purposes. Each clip comprises two lever-like jaws 38 and a wire formed as a coil 40 which constitutes a spring and a fulcrum, and two arms 42 received in notches in the jaws 38. These clips are so universally known that a further description is believed to be unnecessary. Three of these clips are employed, one on each of the three members of the frame, and in the manufacture of the frame members the wires are passed through the coils 40 of the clips before the wires are bent into the forms shown.

As shown, the clips are frictionally held against sliding movement lengthwise of the frame members by elastic bands 46 wrapped about the wires of the frame and looped about the clips. These elastic bands may be dispensed with if desired, but they are convenient to keep the clips from sliding too readily. When the device is to be attached to an ordinary shade holder of an electric lamp only one clip (the upper one) is used for this purpose, and the device is simply pendent from the shade holder.

The frame holds the screen a considerable distance from the front of the reflector, thus providing for necessary ventilation, and preventing injury to the screen by the heat. The screen projects laterally a considerable distance beyond the reflector so that none of the light rays shall escape forwardly except through the screen. However, some light rays might be reflected laterally and rearwardly toward the camera lens and cause flare. To intercept any such reflected rays at the sides, in the present example I have provided two light-intercepting walls 48 (see Fig. 3) which also may conveniently serve as the two parts of a box to contain the frame and the screen. One box part is slightly smaller than the other so that they will telescope together.

As a convenient means to attach the box parts to the sides 14 of the frame, elastic bands 50 are attached to the walls 48 as by fasteners such as rivets 52 (see Fig. 7) and the intermediate portions of the bands are suitably attached to the associated spring clips 36 as illustrated, for example in Figs. 4 and 5. One way is to pass the strands of the elastic band across the forward part of the clip as shown in Fig. 4, after which the clip is rotated about the wire on which it is mounted, thus wrapping the strands partly about the wire, as shown in Fig. 5. The jaws of the clip are then applied to the rim of the reflector 34.

When the device is not in use, the frame and the screen are collapsed within one of the box parts as shown in Fig. 6, and the other box part serves as a cover. When the device is to be set up for use, the frame and the screen are then taken out of the box and the frame is unfolded. The first step is illustrated in Fig. 8 which shows one left-hand side member 14 swung upwardly toward the right and locked by passing the portion 20 between the arm 26 and the locking portion 32. The other side member is then swung downwardly to the right as shown in Fig. 9, after which it is locked in the same fashion. The box parts can then be applied to the sides, as already described, and the three clips snapped onto the rim of the reflector as shown in Figs. 1, 2 and 3.

The device is now ready for use and is perfectly rigid and stable so that the reflector may be placed in any angular position and yet the screen will be maintained in its proper relationship with the reflector and the lamp, and ample space is provided for ventilation.

Having thus described one embodiment of the invention but without limiting myself thereto, what I claim, and desire by Letters Patent to secure, is:

1. In a light transmitting and diffusing device for use with a light source, the combination of a translucent, diffusing screen of flexible material, and a stretcher which in and of itself and without external aid normally maintains said screen in a plane, said stretcher comprising two generally parallel, opposite parts extending along and attached to opposite marginal portions of said screen, and means including a part extending along another marginal portion of said screen and normally maintaining said parts spread apart and having provision to permit said parts to be moved toward each other to collapse said stretcher and said screen, said parts bounding an unobstructed, light-transmitting opening.

2. In a light transmitting and diffusing device for use with a light source, the combination of a translucent, diffusing screen of flexible material, and a frame normally maintaining said screen in a plane, said frame comprising two parts each having outer and inner generally parallel portions, said outer portions being attached to two opposite margins of said screen, and a third part having a portion extending lengthwise of a third margin of said screen, means forming pivotal joints between said third part and the other two parts and enabling said other two parts to be swung toward each other, and means normally locking said other two parts against swinging movement toward each other, and having provision for unlocking said other two parts.

3. In a light-transmitting and diffusing device for use with a light source, the combination of a self-sustaining framework capable of attachment to and detachment from the margin of a reflector, said framework including two opposite parts and at least one other part on which said opposite parts are mounted to move toward and from each other, and locking means normally to lock said opposite parts against movement toward each other, and a flexible, translucent, diffusing screen whose opposite marginal portions are attached to said opposite parts independently of support other than said framework.

4. In a light-transmitting and diffusing device for use with a light source, the combination of a flexible translucent, diffusing screen, and a supporting frame therefor comprising two side members and a third member which connects said side members and normally holds them spaced apart, each side member having two parallel portions, one portion of each being attached to opposite margins of said screen, said third member being provided with two diverging arms which extend obliquely in generally opposite directions and constitute pivots, one for the parallel portions of one of said side members, and the other pivot for the parallel portions of the other side member, said side members being normally locked in extended position by locking portions on said arms engaged with said parallel portions which are attached to opposite margins of said screen, the last-named parallel portions being slidable along said arms to disengage them from said locking portions.

CHARLES W. SHERMAN.